United States Patent [19]
Rogers et al.

[11] Patent Number: 5,602,733
[45] Date of Patent: Feb. 11, 1997

[54] AUTOMOTIVE SERVICE EQUIPMENT EXPERT SYSTEM

[75] Inventors: Steven W. Rogers; James L. Dale, Jr.; Alan D. Casby, all of Conway; Jean O. W. de Bellefeuille, Maumelle, all of Ark.

[73] Assignee: FMC Corporation, Chicago, Ill.

[21] Appl. No.: 444,447

[22] Filed: May 19, 1995

Related U.S. Application Data

[63] Continuation of Ser. No. 160,467, Dec. 1, 1993, abandoned, which is a continuation of Ser. No. 811,510, Dec. 20, 1991, abandoned.

[51] Int. Cl.⁶ .................................................. G06F 19/00
[52] U.S. Cl. .............................. 364/424.034; 364/424.04; 364/551.01
[58] Field of Search ...................... 364/424.01, 424.03, 364/424.04, 550, 554, 580, 551.01; 395/905; 371/15.1, 17

[56] References Cited

U.S. PATENT DOCUMENTS

| | | | |
|---|---|---|---|
| 4,757,463 | 7/1988 | Ballou et al. | 364/424.04 |
| 4,777,585 | 10/1988 | Kokawa et al. | 395/905 |
| 4,841,456 | 6/1989 | Hogan, Jr. et al. | 364/550 |
| 4,868,755 | 9/1989 | McNulty et al. | 364/424.01 |
| 4,967,337 | 10/1990 | English et al. | 364/550 |
| 4,977,524 | 12/1990 | Strege et al. | 364/424.04 |
| 4,984,174 | 1/1991 | Yasunobu et al. | 395/905 |
| 4,985,857 | 1/1991 | Bajpai et al. | 364/580 |
| 5,005,143 | 4/1991 | Altschuler et al. | 364/554 |
| 5,014,227 | 5/1991 | Kling et al. | 364/559 |

FOREIGN PATENT DOCUMENTS

| | | |
|---|---|---|
| 000109788 | 12/1990 | France . |
| 1052551 | 2/1989 | Japan . |
| 2310138 | 12/1990 | Japan . |

OTHER PUBLICATIONS

Patent Abstract of Japan, A–01–052551, vol. 13, No. 244, Jun., 1989.
"Industrial Application of Artificial Intelligence" by Candy et al., Proceeding of The 1985 IEEE Region 5 Conference, Mar. 13–15 1985, pp. 25–30.
Revue Automobile, vol. 76, No. 13, pp. 11–13, Mar. 1982.
System Experts, No. 29, Dec. 1990, Paris France, p. 5 "Renault: Un Systeme Expert Dan 500 Station De Diagnostic".
Patent Abstracts of Japan, A–02–310138 vol. 15, No. 97, Mar. 1991.

*Primary Examiner*—Gary Chin
*Attorney, Agent, or Firm*—Niro, Scavone, Haller & Niro

[57] ABSTRACT

An automotive service equipment system for measuring vehicle or vehicle component characteristics is disclosed which includes an expert system so that operators at all skill levels may operate the system efficiently and relatively error free. Such systems as vehicle wheel aligners, vehicle wheel balancers and vehicle brake lathes are described in conjunction with a corresponding expert system.

8 Claims, 5 Drawing Sheets

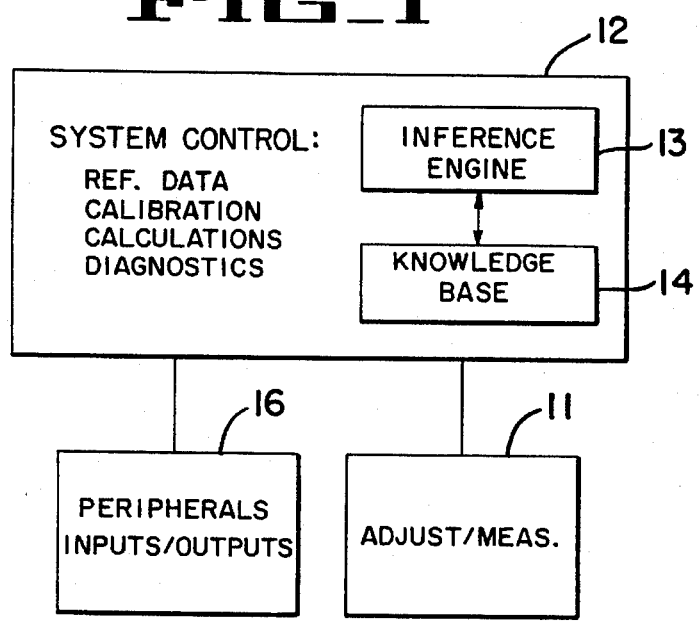
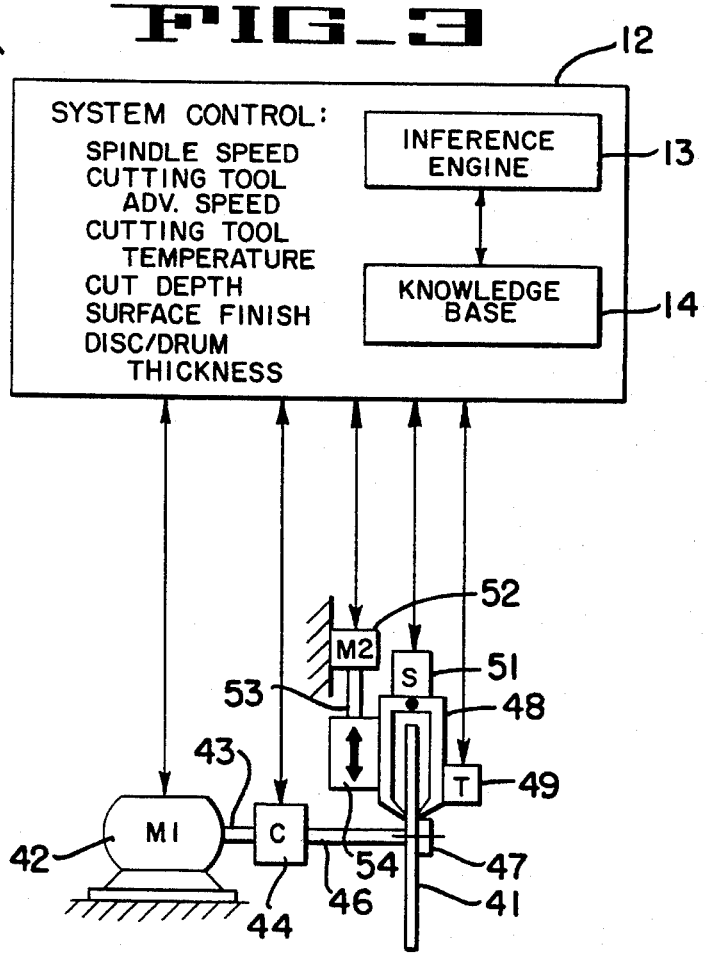

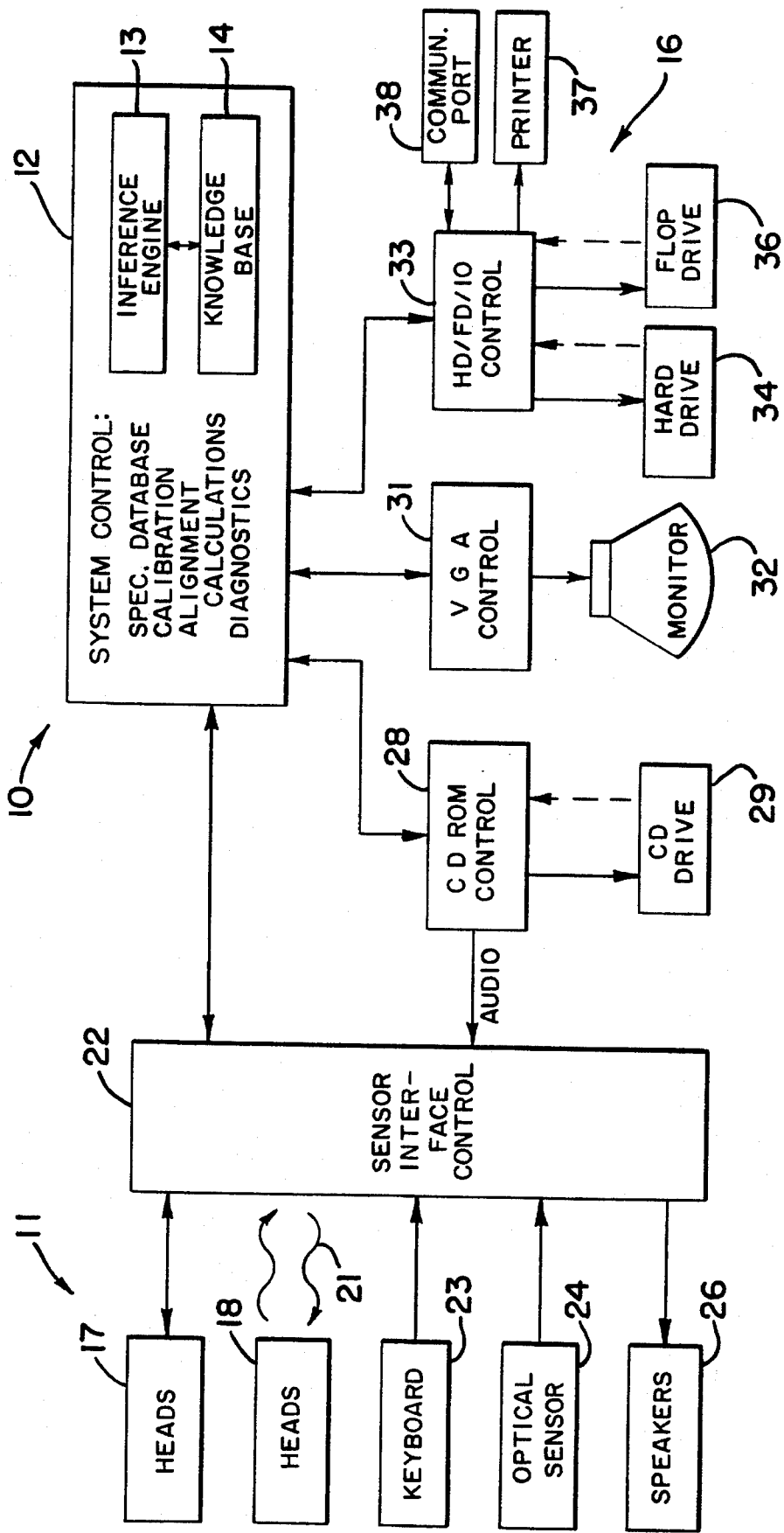

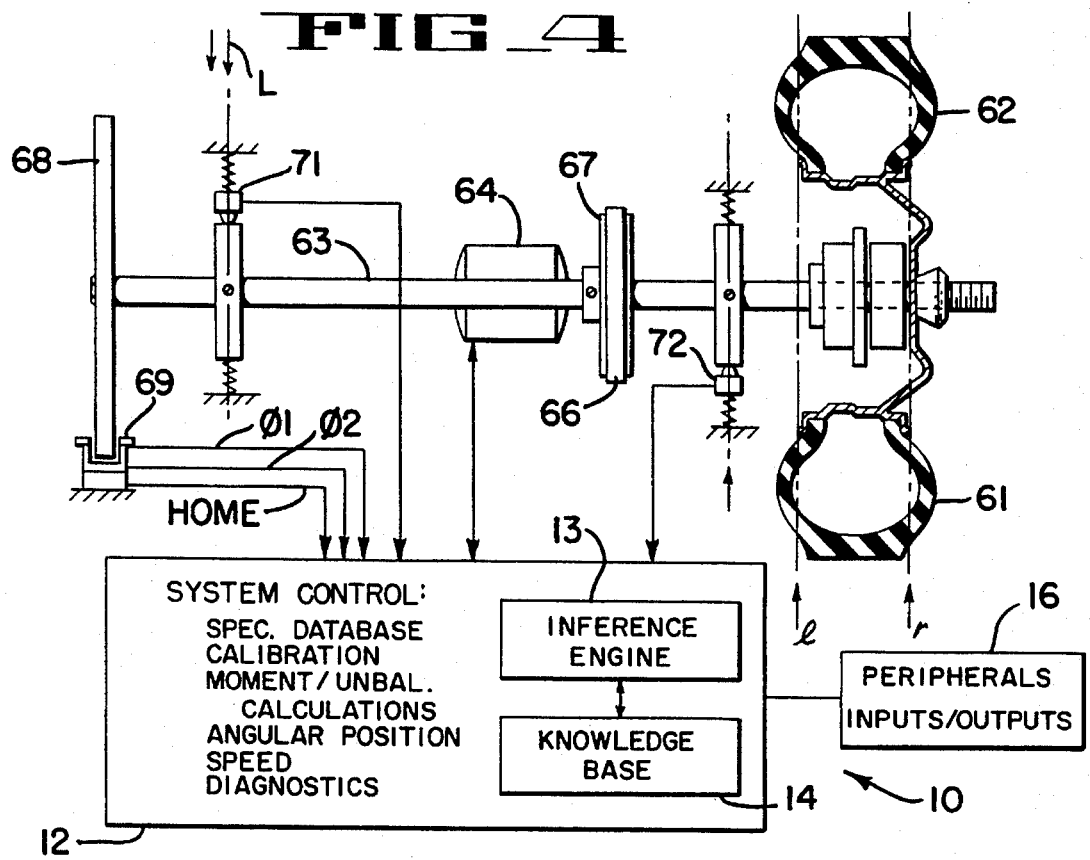
FIG_4
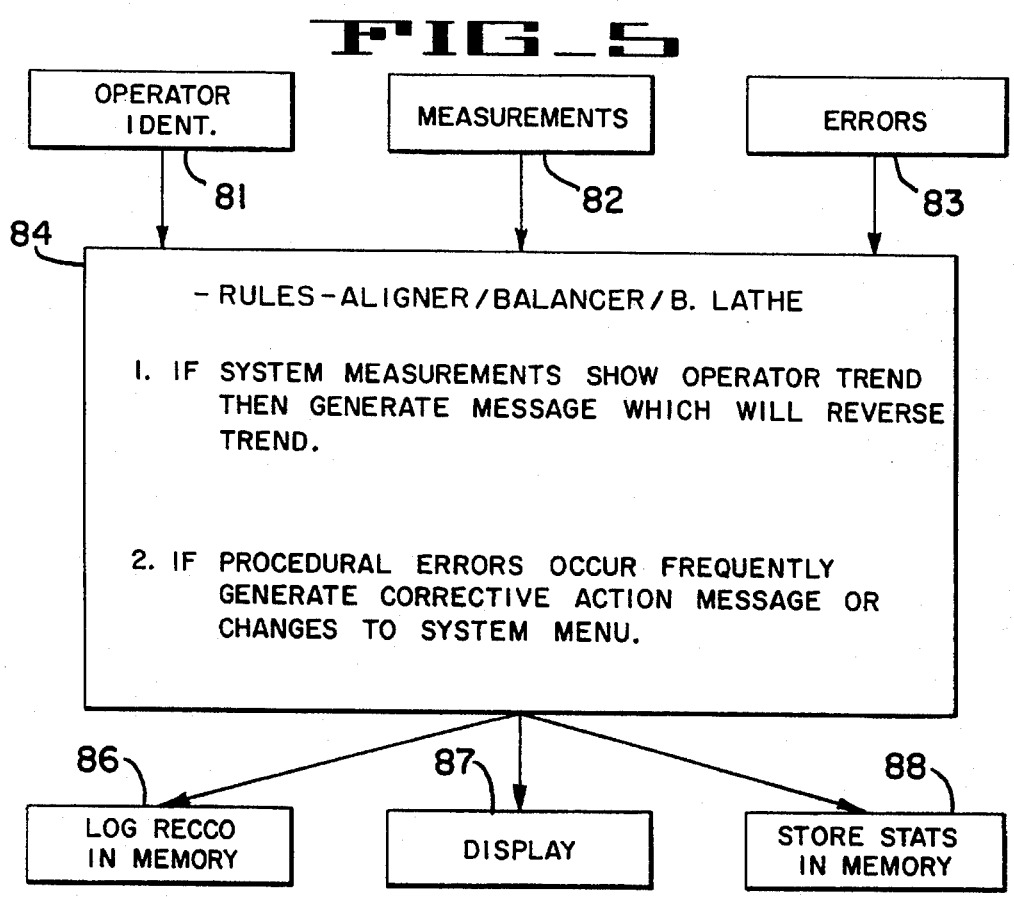
FIG_5

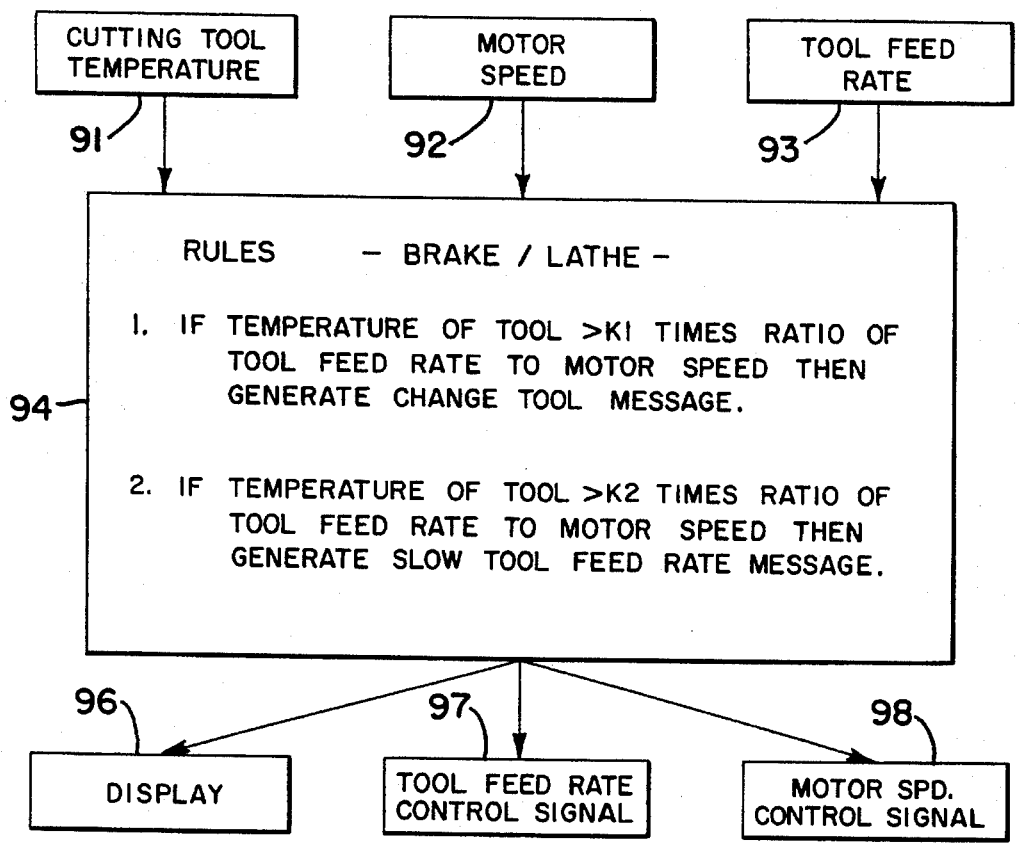
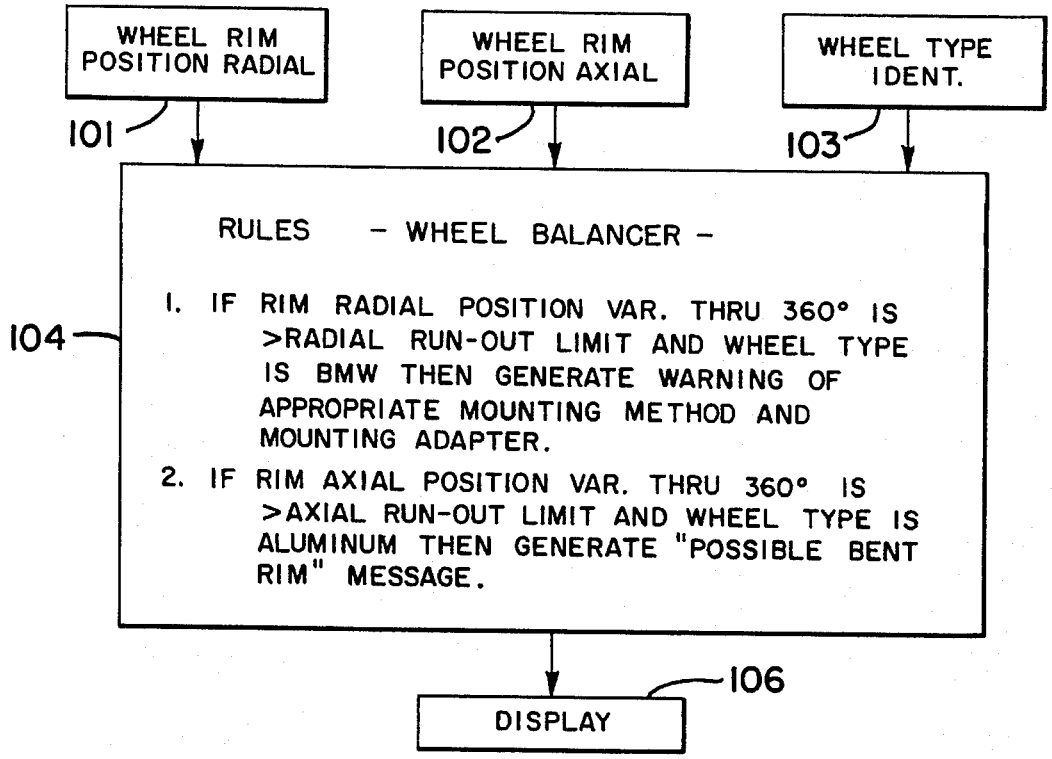

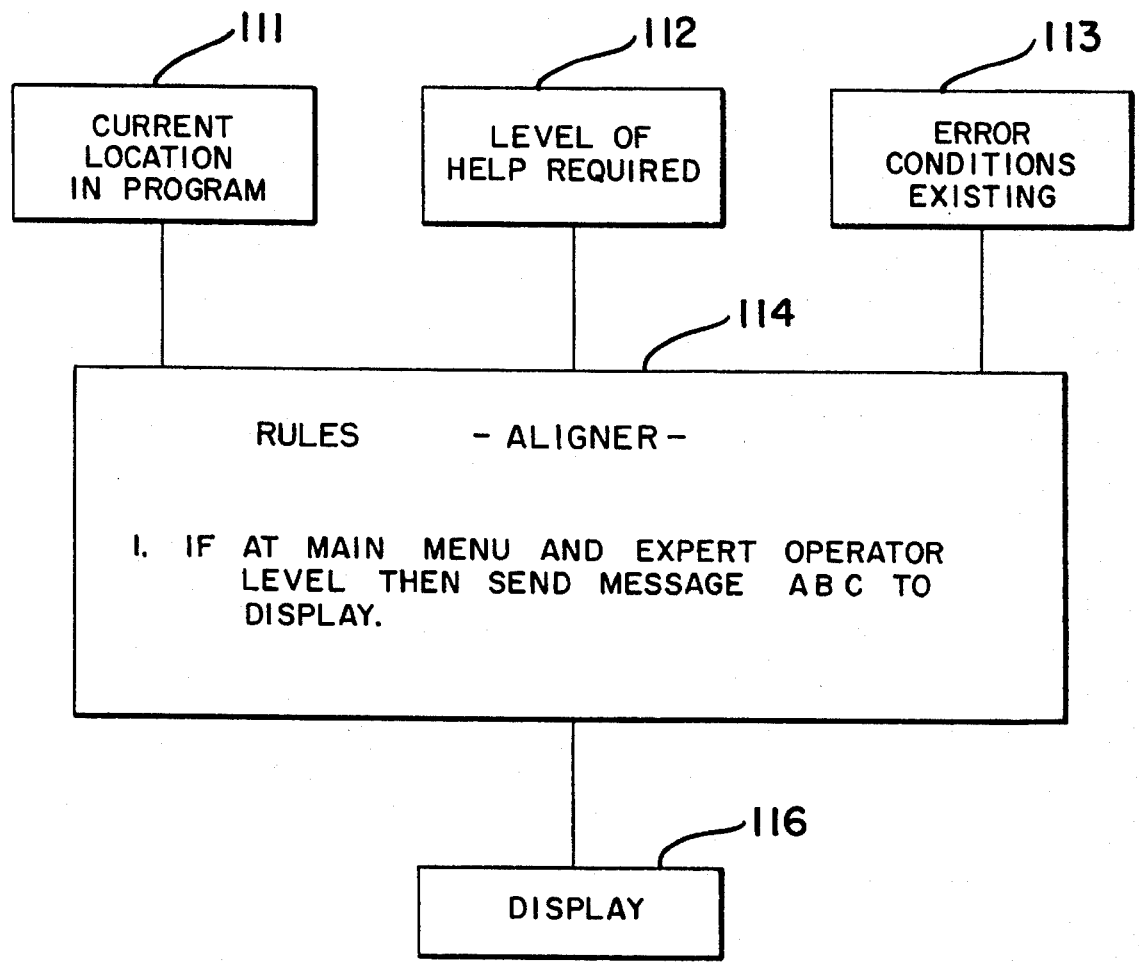
FIG_8

AUTOMOTIVE SERVICE EQUIPMENT EXPERT SYSTEM

This application is a continuation of application Ser. No. 08/160,467, filed 12/1/93, which is a continuation of application Ser. No. 07/811,510, filed 12/20/91, both of which are now abandoned.

SUMMARY OF THE INVENTION

The invention herein relates to apparatus for providing expert guidance to an operator relating to operation of an automotive service equipment system which provides system outputs which are indicative of an adjustable condition of an automotive component. A knowledge base means is included for providing rules relating to procedures for operation of a specific automotive service equipment system. Also included is an inference engine means for operating on the knowledge base rules and the system outputs so that conclusion signals are produced relating to the operation of the specific automotive service equipment system. Additionally, a system controller is connected to receive the conclusion signals and means is connected to the system controller for displaying expert guidance messages and operator prompts in accordance with the conclusion signals so that adjustment is made to the condition of the automotive component in accordance with the expert guidance messages and operator prompts.

Further, the invention disclosed herein relates to apparatus for providing expert guidance and real time control for an automotive service equipment system for measuring and adjusting adjustable operating characteristics of a specific automotive vehicle. Knowledge base means is included for providing rules relating to performance of a specific automotive equipment system and the specific operating characteristics of the vehicle. Inference engine means is also included for operating on the knowledge base rules and the measured operating characteristics, whereby conclusion signals are produced relating to the manner of operating the specific automotive equipment system and to the adjustable operating characteristics of the specific automotive vehicle. Further, a system controller is included which is connected to the specific automotive service equipment system to receive the conclusion signals and means is also included which is connected to the system controller for providing real time control of adjustment of the operating characteristics in accordance with the conclusion signals.

In addition, the invention disclosed herein relates to apparatus for use with an automotive service equipment system for measuring and adjusting a condition of an automotive component, which system is subject to operation by operators having various levels of skill and is further subject to erroneous operation by operators having lesser levels of skill. Knowledge base means is included for providing rules for relating to skilled operation of a specific automotive service equipment system wherein the specific automotive service equipment system provides system outputs. Inference engine means is included for operating on the knowledge base rules and the system outputs so that conclusion signals are produced relating to the manner of operating the specific automotive service equipment system. Further, a system controller is included within the specific automotive service equipment system and is connected to receive the conclusion signals, together with means connected to the system controller for displaying guidance messages and operator prompts to obtain an efficient manner of operation of the specific automotive service equipment system and to minimize system operating procedure errors for substantially all operator skill levels.

BRIEF DESCRIPTION OF THE DRAWINGS

FIG. 1 is a block diagram of the present invention.

FIG. 2 is a block diagram of the present invention in the form of an automotive service wheel alignment system.

FIG. 3 is a block diagram of the present invention in the form of an automotive service brake lathe system.

FIG. 4 is a block diagram of the present invention in the form of an automotive service wheel balancer system.

FIG. 5 is an input/output chart for an automotive service equipment system of the present invention.

FIG. 6 is an input/output chart for an automotive service brake lathe system of the present invention.

FIG. 7 is an input/output chart of an automotive service wheel balancer system of the present invention.

FIG. 8 is an input/output chart of an automotive service alignment system of the present invention.

DESCRIPTION OF THE PREFERRED EMBODIMENTS

As automotive service equipment systems become more complex, systems must become more helpful to the system operators, since operators of the systems exist at all levels of expertise from the most inexperienced to the most expert. In the past, set lists of procedures have been displayed to a system operator, wherein the lists of procedures are based on usual circumstances, but are unable to provide a meaningful instruction when unusual circumstances arise. Moreover, certain system operators are able to operate the systems and to adjust characteristics relating to a specific vehicle without difficulty, whereas other operators, of lesser expertise, may find the system operation beyond their capabilities even in the presence of the aforementioned lists of procedural steps which are available in a display. The goal of the invention disclosed herein is to provide expert or near expert operation for automotive service equipment systems in the diagnosis and adjustment of vehicle characteristics when the system is operated by persons of widely varying skill levels. Expert systems have been used in many areas, extending from the volume preparation of foods to the design of air frames for supersonic aircraft. The invention herein relates to implementation of an expert system in automotive service equipment systems for accommodating system operators of any skill level.

An expert system includes a knowledge base (data base) which embodies a set of rules relating to a specific field, for example, automotive wheel alignment, wheel balancing or vehicle brake member refinishing. The knowledge base is generated by compiling information from experts in the pertinent field into a data base. Coupled with the knowledge base is a software program called an inference engine which operates on the rules in the knowledge base together with inputs obtained other data bases and/or from information gathered by the automotive service equipment system. The automotive service equipment system outputs therefore become inputs which taken together with the rules in the knowledge base and operated on by the inference engine program provide conclusions which may then be communicated to a system operator, thereby providing the operator with expert guidance without regard to the operator's personal level of expertise in operating a specific automotive service equipment system. The conclusions may take the form of control functions for real time control of system components, information with regard to system operation which may be displayed to the system operator, or operator prompts which may serve to guide the operator through a number of steps in the measurement and adjustment of the vehicle parameters being addressed by the system.

With reference now to FIG. 1 of the drawings a block diagram of the system representing the present invention is shown. An automotive service equipment system 10 relating to apparatus for measuring characteristics of a vehicle or a vehicle component is shown having a system adjustment and measurement portion 11 connected to a system control 12 which contains reference data, calibration factors, calculation operations for use with the system measurements, system diagnostics, etc. Also, within the system control 12 is an inference engine 13 and a knowledge base 14 which cooperate as described hereinbefore. The system 10 often includes peripheral equipment 16 which may provide inputs for and receive outputs from system control 12. It may be seen that data flow is bidirectional between system control 12 and the system adjustment and measurement portion 11 as well as between the system control and the peripherals 16. The peripherals may include a display such as a visual graphics array, a printer, speakers, input programs, etc., which provide data to and receive data from the system control. As discussed hereinbefore, the knowledge base rules in knowledge base 14 together with the measured quantities from the system adjust and measurement portion 11 or other system inputs are operated upon by the program contained in the inference engine 13 to produce conclusion signals or outputs which are expert conclusions in view of the expertise contained in knowledge base 14. The conclusion signals or outputs from the expert system portion of system control 12 are then presented to displays contained in the peripherals 16 to be viewed by an operator or presented to the system adjust and measurement portion 11 for real time control of system components in accordance with the combined system measurement outputs and knowledge base rules.

The program contained in the inference engine 13 of FIG. 1 is generated with knowledge of a specific automotive services equipment system. The input variables are obtained through the system adjust and measurement segment 11 and the identification and location of the variables within the system confines. Other input variables may be input to the system from outside sources. Knowledge base 14 contains rules specific to the automotive services equipment system present and the various types and models of vehicles with which the system will be called upon to function. Further, the outputs or conclusion signals mentioned heretofore which are available and of interest must be identified. With this information a programmer sets down to write the program for the inference engine 13. Alternatively, there is available from Information Builders Incorporated of New York, N.Y. a "Level Five" (TM) expert system software program written in a rule based language to generate the operating program representing the inference engine. In any event, a programmer obtains the identity of the system measured variables and where they are located in the system and then obtains the set of rules for the knowledge base required by the specific system involved. Obtaining then the outputs which are required and/or available, the programmer writes the operating program contained in the inference engine to thereby apply the inputs to the rules and obtain the outputs or conclusions together with probabilities of the correctness of the conclusions.

It should be noted that an automotive alignment system, an automotive wheel balancer, and an automotive brake lathe all contain components within the specific automotive services equipment systems involved to be controlled by the system. For example, audio speakers in an alignment system, the mounting shaft spin motor in a wheel balancer, and brake member cutter drive components in a brake lathe. All three systems likewise are subject to varying levels of efficiency and accuracy of operation, normally in direct proportion to the expertise of the operator. All three systems, therefore, in the context of the invention disclosed herein contain expert guidance displays responsive to the conclusion signals obtained from the system control 12 as a result of the interaction of the inference engine 13 and the knowledge base 14 together with the system data base inputs and the measured input quantities from measurement portion 11 of the overall system 10.

Turning now to FIG. 2 of the drawings, an automotive services equipment system 10 is represented by an advanced vehicle wheel alignment system containing the system control 12, inference engine 13 and knowledge base 14 mentioned hereinbefore with respect to the description of FIG. 1. The system adjustment and measurement segment shown generally at 11 in FIG. 2 contains, by way of example, alignment heads 17 and 18 which are representative of vehicle wheel mounted heads coupled to the system by means of cables 19 or transmitted energy 21. The transmitted energy may be infrared transmission, or transmission in some other portion of the electro-magnetic spectrum. A sensor interface control 22 is shown which functions to condition system input signals and to connect them to the system control 12. The function of the sensor interface control is completely described in copending patent application entitled Wheel Alignment System U.S. Ser. No. 07/811,493 filed Dec. 20, 1991 is assigned to the assignee of the invention described herein.

As may be seen further in FIG. 2, a keyboard 23, an optical sensor 24 and speakers 26 are also connected to the sensor interface control 22. Keyboard 23 is used to provide instructions to the sensor interface control from a system operator, optical sensor 24 is used to receive system optical control signals and to couple them to the system 10, and speakers 26 are used to provide audible information and instruction to a system operator.

The automotive services equipment system 10 of FIG. 2 also has a number of peripheral devices, as shown, including a compact disc (CD) (ROM control) 28 with a controlled CD drive 29 in communication with the system control 12 and providing an audio output to sensor interface control 22 for conditioning and delivery to the speakers 26. Additionally, a visual graphics array (VGA) control 31 is shown in communication with the system control 12, also performing to drive a system monitor 32 for visually displaying system expert instructions and operator prompts. A hard disc (HD)/ floppy disc (FD) and input/output (IO) control 33 is shown in communication also with system control 12. A hard disc drive 34 and a floppy disc drive 36 are shown connected to control 33 for driving the discs which carry information to be communicated to the system control 12. An additional display device is represented by the printer 37 coupled to the control 33 and a communications port 38 is provided for additional exposure of the system 10 to system external inputs and data bases. The system control in the automotive service equipment system 10 shown in FIG. 2 includes, for example, a vehicle specification data base, calibration factors, alignment calculation algorithms, system diagnostics, etc. The combination of the system outputs connected to the system control 12 and combined with the rules in the knowledge base 14 are operated upon by the program of the inference engine 13 to provide the aforementioned system conclusion signals which in turn effect system component real time control, system operator expert alignment procedure guidance and operator procedural prompts.

With reference now to FIG. 3 of the drawings, an automotive service equipment system 10 is shown represented by a brake lathe system for refinishing a disc brake member 41. The validity of the description of the system 10 to follow is as valid for any type of brake member (such as a brake drum) as it is for the refinishing of the disc 41. A system control 12 containing an inference engine 13 and a knowledge base 14 is included in the system in communication with a motor 42 having a driven shaft 43 extending therefrom. The shaft 43 provides an input to a coupling 44 which is in communication with the system control 12. Coupling 44 serves to transmit energy from the motor shaft 43 to a spindle 46 upon which the brake disc 41 and may be any one of several known types. The brake disc is mounted on the spindle by means of a securing nut 47. A cutting tool 48 is disposed to cut the surface of the brake disc 41, and is shown in FIG. 3 as capable of cutting both sides of the brake disc at the same time. A temperature sensor 49 is mounted near the tip of the cutting tool 48 to sense the temperature of the tool cutting edge. The temperature sensor 49 is in communication with the system control 12. A cutting dimension sensor 51 is shown mounted on the cutting tool 48 which provides for such information as disc finished thickness, disc surface finish, etc. Sensor 51 is also in communication with system control 12. The sensor 51 may also be combined with a disc cut thickness control for providing a predetermined cutting depth for the tool 48 as well as the disc cut thickness if these measurements are of interest to the automotive service equipment system 10 represented by the brake lathe system of FIG. 3.

A motor 52 is shown in FIG. 3 in communication with the system control 12, wherein the motor 52 serves to drive a lead screw through 53 which advances and retracts a member 54 upon which the cutting tool 48 is mounted. It may be seen from the foregoing that the system control 12 together with the motor 42, the coupling 44, the temperature sensor 49, the cutting dimension sensor 51, and the cutter movement motor 52, may be used for controlling the speed of the spindle 46, the advancing speed of the cutting tool 48, the combination of spindle speed and cutting tool advance rate to maintain the desired cutting tool tip temperatures, the depth of cut on the surface of the brake disc 41, as well as, among other things, the disc surface finish and finished disc thickness. These foregoing characteristics of the operation performed by the system 10 on the brake disc 41 rely upon system inputs coupled with the rules in knowledge base 14 which are operated upon by the program contained in inference engine 13 to provide conclusion signals or outputs which may be shown at a system display (not shown in FIG. 3) or used to control motor 42, coupler 44, cutting dimension sensor 51 or motor 52.

With reference now to FIG. 4 of the drawings an automotive service equipment system 10 is shown represented by a wheel balancing system for determining and providing correction for axial and radial unbalance of a wheel assembly containing a wheel rim 61 and a tire 62. The system of FIG. 4, as do those systems described hereinbefore, contains a system control 12 which includes an inference engine 13 and a knowledge base 14. The system controller is in communication with certain peripheral equipment 16 which includes a display and potentially other peripheral equipment as described herein with regard to the other drawing figures.

It may be seen in FIG. 4 that the wheel balancer represented there has a spinning shaft 63 driven by a motor 64 through a belt 66 contacting a shaft mounted pulley 67. At the end of the shaft 63 opposite the end upon which the rim 61 and tire 62 assembly is mounted, an encoder disc 68 is attached to the shaft for rotation therewith, thereby providing several shaft rotation characteristic signals from an encoder position and speed sensor 69. The sensed encoder signals are connected to the system control 12 as are signals from a left force transducer 71 and a right force transducer 72 which provide output signals indicative of unbalance magnitude and phase in the rim and tire assembly being spun on the shaft 63.

The output signals from the adjustment and measurement portion of the wheel balancer shown in FIG. 4 are combined with the wheel balancer specific rules in the knowledge base 14 and operated upon by the program contained in the inference engine 13 to provide conclusion signals or outputs. The system control includes a specification data base, calibration factors, moment/unbalance calculation algorithms, angular position and speed algorithms and system diagnostics, for example. The conclusion signals from system control 12 are used to display procedural steps to an operator based on the rules in the knowledge base and the measured outputs of the system which are input to the knowledge base or used to control wheel balancer components within the system to effect an efficient use of the system and to minimize operator induced measurement and procedural errors.

In FIG. 5 the inputs, knowledge base and inference engine operations and outputs are shown for one aspect of an expert system which applies to automotive wheel alignment systems, wheel balancer systems or vehicle brake lathe systems or the like. An operator identification is shown at 81 together with a series of measurements 82 through a series of measurement uses of the system by the identified operator and corresponding errors 83 indicated by the system outputs. The aforementioned three inputs are applied to the rules 84 for an aligner or a balancer or a brake lathe system to see if the system measurements show an operator trend. If such a trend is shown, then the conclusion signal will generate a message which has as its purpose to reverse the trend if the trend is undesirable. Further, if the inputs coupled with the rule base show that procedural errors occur frequently, the conclusion signal will generate a corrective action message or generate changes to the system menu if that alternative provides a solution. These conclusion signals will be logged as recommendations logged in memory, displayed to a system operator 87, and/or stored in s memory as statistical data 88.

Focusing now on FIG. 6 of the drawings, an input block 91 labeled cutting tool temperature is seen together with an input block 92 labeled motor speed and an input block 93 labeled tool feed rate. The diagram of FIG. 6 is specific to a brake lathe automotive service equipment system 10. A rules block 94 recites that if the temperature of the tool is greater than a first constant times the ratio of the tool feed rate to the motor speed, then a message is generated which requires the system operator to change the cutting tool. In this instance, the expert system has concluded that a high cutting tool temperature with normal tool feed rate and motor speed indicates a dull cutting tool. Additionally, the rules block 94 indicates that if the temperature of the tool is greater than a second constant times the ratio of the tool feed rate to the motor speed, then the conclusion signal will generate a message informing the system operator to slow the tool feed rate. In this instance, the expert system has concluded that since the temperature is above normal, but not excessively high, then the tool cutting tip is in acceptable condition, but high temperature is a result of a higher than appropriate tool feed rate. As shown in FIG. 6, the conclusion signal generated messages may be sent to a display 96, a control 97 for tool feed rate (item 52 of FIG. 3) or a control 98 for the drive motor speed (items 42 or 44 of FIG. 3).

With reference to FIG. 7 of the drawings, an example of inputs to a wheel balancer automotive service equipment system is shown including inputs for wheel rim radial position 101, wheel rim axial position 102 and wheel type identification 103. Exemplary rules relating to a wheel balancer system are shown in block 104 for combination with the aforementioned inputs, containing the proposition that if the rim radial position variation throughout 360 degrees of wheel turn is greater than the radial runout limit and the wheel type is from a BMW vehicle, then a warning message directing use of an appropriate mounting method and use of an appropriate mounting adapter is generated. Further, the rules exemplified by FIG. 7 assert that if the rim axial position variation throughout 360 degrees of turn of the wheel assembly is greater than the axial runout limit and the wheel type is aluminum, then a message is generated that a possible bent wheel rim is present. The aforementioned conclusion messages or signals are coupled to a display 106 in FIG. 7 for communication to an operator of the wheel balancer system.

With reference now to FIG. 8 of the drawings, an exemplary portion of an expert system is shown relating to a wheel alignment system. An input 111 relating to the current location of the system in the operating program is provided together with an input 112 relating to the level of help required from the expert is system. The level of help required relates to whether the operator is a novice requiring a high or expert level of help, or whether the operator is nearly an expert himself, therefore requiring a lower detailed level of help. Additionally, an input 113 relating to existing error conditions is available. The exemplary rule relating to wheel alignment automotive service equipment system is shown in FIG. 8 at block 114. If the program is at the main menu location and expert operator level of help is required, then the conclusion signal generates an appropriate message (message ABC in FIG. 8) for presentation to a display. The conclusion signal is displayed in the form of an appropriate message by the display block 116.

It may be seen that the set of rules for each of the three automotive service equipment systems mentioned herein are too numerous in number to set forth here. Exemplary rules have been recited for each type of automotive service equipment system discussed, wherein some rules apply to specific systems and others are general enough to apply to any one of the three mentioned systems. It should be noted that one aspect of the expert system based automotive service equipment systems disclosed herein is the ability to provide product line specific trend information in operator measurement techniques and results for providing expert advice to an operator with regard to how to effect improvement techniques and procedures to more efficiently operate the system. Further, the expert system based system disclosed herein relates to statistic recording of erroneous proceedings and measurements from a particular automotive service equipment system to be used to make remedial changes in displayed system procedures or to provide expert advice to a system operator with regard to corrective action and substantially error free system operation in the future.

Although the best mode contemplated for carrying out the present invention has been herein shown and described, it will be apparent that modification and variation may be made without departing from what is regarded to be the subject matter of the invention.

What is claimed is:

1. Apparatus for providing expert guidance to an operator relating to adjustment of a wheel alignment condition existing in an automotive suspension through operation of an automotive service equipment wheel alignment system providing automotive suspension condition indicative outputs comprising:

knowledge base means for providing rules relating to procedures for adjustment of the wheel alignment condition;

inference engine means for operating on said knowledge base rules and said automotive suspension condition indicative outputs and for producing instruction signals for guidance of adjustment of the wheel alignment condition;

a system controller connected to receive said instruction signals;

means connected to said system controller for displaying expert guidance messages and operator prompts for guidance of adjustment in accordance with said instruction signals;

means for storing identity of and occurrence of system procedural errors committed by an operator of the automotive service equipment wheel alignment system;

and means for identifying and for communicating to the operator corrective action and procedural changes to avoid said system procedural errors.

2. Apparatus for providing expert guidance to an operator of a brake disc lathe relating to adjustment of a brake disc condition through operation of a brake disc lathe system providing brake disc condition outputs, comprising:

knowledge base means for providing rules relating to procedures for adjustment of the brake disc condition;

inference engine means for operating on said knowledge base rules and said brake disc condition outputs and for producing instruction signals relating to guidance of adjustment of the brake disc condition;

a system controller connected to receive said instruction signals; and means connected to said system controller for displaying expert guidance messages and operator prompts for guidance of adjustment in accordance with said instruction signals;

wherein the brake disc lathe has a cutting tool, motor means for turning the lathe, and means for moving the cutting tool across the surface of a brake member, comprising means for sensing the temperature of the cutting tool and providing a temperature signal coupled to said inference engine, whereby said instruction signals cause said system controller to regulate the speeds of said motor means and said means for moving the cutting tool to maintain the temperature of the cutting tool below a predetermined temperature.

3. Apparatus for use with an automotive service equipment system for measuring and providing outputs relating to an alignment condition for an automotive support wheel, wherein the system is subject to operation by operators having various levels of skill and is further subject to erroneous operation by operators having lesser levels of skill, comprising:

knowledge base means for providing rules relating to adjustment of the wheel alignment condition;

inference engine means for operating on said knowledge base rules and the system outputs, so that instruction signals are produced relating to guidance of adjustment of the wheel alignment condition;

a system controller connected to the automotive service equipment system and further being connected to receive said instruction signals;

means connected to said system controller for displaying guidance messages and operator prompts for guidance of adjustment to obtain an efficient adjustment of the wheel alignment condition during said adjustment in accordance with said instruction signals and to minimize adjustment operating procedure errors for substantially all operator skill levels and means for storing identity of and occurrence of said adjustment operating procedure errors and for providing adjustment operating procedure error statistics, and wherein said means for displaying comprises means for receiving said instruction signals and said adjustment operating procedure error statistics and for displaying corrective action and adjustment operating procedure changes based thereon.

4. Apparatus for providing expert guidance to an operator relating to adjustment of a wheel unbalance condition existing in a vehicle support wheel discovered through operation of an automotive service equipment wheel balancer system providing wheel unbalance indicative outputs, comprising:

knowledge base means for providing rules relating to procedures for adjustment of the wheel unbalance condition;

inference engine means for operating on said knowledge base rules and the wheel unbalance indicative outputs and for producing instruction signals for guidance of adjustment of the wheel unbalance condition;

a system controller connected to receive said instruction signals;

means connected to said system controller for displaying expert guidance messages and operator prompts for guidance of adjustment in accordance with said instruction signals; and means for storing identity of and occurrence of system procedural errors committed by an operator of the automotive service equipment wheel balancer system, and means for identifying and for communicating to the operator corrective action and procedural changes to avoid said system procedural errors.

5. Apparatus for providing expert guidance to an operator of a brake disc lathe relating to adjustment of a brake disc condition through operation of a brake disc lathe system providing brake disc condition outputs, comprising:

knowledge base means for providing rules relating to procedures for adjustment of the brake disc condition;

inference engine means for operating on said knowledge base rules and said brake disc condition outputs and for producing instruction signals relating to guidance of adjustment of the brake disc condition;

a system controller connected to receive said instruction signals; and means connected to said system controller for displaying expert guidance messages and operator prompts for guidance of adjustment in accordance with said instruction signals; and means for storing identity of and occurrence of system procedural errors committed by an operator of the brake disk lathe system, and means for identifying and for communicating to the operator corrective action and procedural changes to avoid the system procedural errors.

6. Apparatus for use with an automotive service equipment system for measuring and providing system outputs relating to a wheel unbalance condition in a vehicle support wheel assembly wherein the system is subject to operation by operators having various levels of skill and is further subject to erroneous operation by operators having lesser levels of skill, comprising:

knowledge base means for providing rules relating to adjustment of the wheel unbalance condition;

inference engine means for operating on said knowledge base rules and the system outputs, so that instruction signals are produced relating to guidance of adjustment of the wheel unbalance condition;

a system controller connected to the automotive service equipment system and further being connected to receive said instruction signals;

means connected to said system controller for displaying guidance messages and operator prompts to obtain guidance for efficient adjustment of the wheel unbalance condition and to minimize adjustment operating procedure errors for substantially all operator skill levels; and means for storing identity of and occurrence of said adjustment operating procedure errors and for providing operating procedure error statistics, and wherein said means for displaying comprises means for receiving said instruction signals and said operating procedure error statistics and for displaying corrective action and operating procedure changes based thereon.

7. Apparatus for use with an automotive service equipment system for measuring and providing system outputs relating to a brake disc condition in a vehicle brake disc wherein the system is subject to operation by operators having various levels of skill and is further subject to erroneous operation by operators having lesser levels of skill, comprising:

knowledge base means for providing rules relating to adjustment of the brake disc condition;

inference engine means for operating on said knowledge base rules and the system outputs, so that instruction signals are produced relating to guidance of adjustment of the brake disc condition;

a system controller connected to the automotive service equipment system and further being connected to receive said instruction signals;

means connected to said system controller for displaying guidance messages and operator prompts to obtain guidance for efficient adjustment of the brake disc condition and to minimize adjustment operating procedure errors for substantially all operator skill levels; and means for storing identity of and occurrence of said adjustment operating procedure errors and for providing operating procedure error statistics, and wherein said means for displaying comprises means for receiving said instruction signals and said operating procedure error statistics and for displaying corrective action and operating procedure changes based thereon.

8. A system for providing expert guidance to an operator of an automotive service equipment system relating to apparatus for measuring characteristics on a vehicle, such apparatus providing braking system characteristic indicative outputs comprising:

knowledge base means for providing rules relating to procedures for adjustment of the braking system characteristic;

inference engine means for operating on said knowledge base rules and said braking system characteristic indicative outputs and for producing instruction signals relating to guidance of adjustment of the characteristic of the braking system;

a system controller connected to receive said instruction signals;

means connected to said system controller for displaying expert guidance messages and operator prompts for guidance of adjustment in accordance with said instruction signals; and means for storing identity of the occurrence of automotive service equipment system procedural errors committed by an operator, and means for identifying and for communicating to the operator corrective action and procedural changes to avoid said procedural errors.

* * * * *